US010453252B2

(12) United States Patent
Chapman et al.

(10) Patent No.: US 10,453,252 B2
(45) Date of Patent: Oct. 22, 2019

(54) 3D MODEL CONSTRUCTION FROM 2D ASSETS

(71) Applicant: Disney Enterprises, Inc., Burbank, CA (US)

(72) Inventors: Steven M. Chapman, Newbury Park, CA (US); Mehul Patel, Stevenson Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/589,387

(22) Filed: May 8, 2017

(65) Prior Publication Data

US 2018/0322695 A1    Nov. 8, 2018

(51) Int. Cl.
*G06T 17/10* (2006.01)
*G06T 15/50* (2011.01)
*G06T 17/00* (2006.01)
*G06T 5/00* (2006.01)
*G06T 7/579* (2017.01)
*G01C 11/08* (2006.01)

(52) U.S. Cl.
CPC .............. *G06T 17/10* (2013.01); *G01C 11/08* (2013.01); *G06T 5/001* (2013.01); *G06T 7/579* (2017.01); *G06T 15/50* (2013.01); *G06T 17/00* (2013.01); *G06T 2207/10016* (2013.01)

(58) Field of Classification Search
USPC ......................................................... 345/427
See application file for complete search history.

(56) References Cited

U.S. PATENT DOCUMENTS

| | | |
|---|---|---|
| 6,466,205 B2 | 10/2002 | Simpson et al. |
| 7,978,892 B2 | 7/2011 | Quadling et al. |
| 8,520,935 B2 | 8/2013 | Wang et al. |
| 8,542,911 B1 | 9/2013 | Korobkin |
| 8,655,052 B2 | 2/2014 | Spooner et al. |

(Continued)

OTHER PUBLICATIONS

Hilton et al., From 3D Shape Capture to Animated Models, Centre for Vision, Speech and Signal Processing, University of Surrey, Guildford GU27XH, UK, 2002, pp. 1-10, retrieved from www.ee.surrey.ac.uk/CVSSP/VMRG/Publications/hilton023dpvt.pdf.

(Continued)

*Primary Examiner* — Kimbinh T Nguyen
(74) *Attorney, Agent, or Firm* — Sheppard Mullin Richter & Hampton LLP

(57) ABSTRACT

Features of the surface of an object of interest captured in a two-dimensional (2D) image are identified and marked for use in point matching to align multiple 2D images and generating a point cloud representative of the surface of the object in a photogrammetry process. The features which represent actual surface features of the object may have their local contrast enhanced to facilitate their identification. Reflections on the surface of the object are suppressed by correlating such reflections with, e.g., light sources, not associated with the object of interest so that during photogrammetry, such reflections can be ignored, resulting in the creation of a 3D model that is an accurate representation of the object of interest. Prior to local contrast enhancement and the suppression of reflection information, identification and isolation of the object of interest can be improved through one or more filtering processes.

19 Claims, 5 Drawing Sheets

(56) References Cited

U.S. PATENT DOCUMENTS

| | | |
|---|---|---|
| 8,749,580 B1 | 6/2014 | Lininger |
| 8,861,800 B2 | 10/2014 | Savvides et al. |
| 9,047,553 B2 | 6/2015 | Abeloe |
| 9,286,717 B2 | 3/2016 | Le et al. |
| 9,407,904 B2 | 8/2016 | Sandrew et al. |
| 9,438,878 B2 | 9/2016 | Niebla, Jr. et al. |
| 9,460,517 B2 | 10/2016 | Fathi et al. |
| 2005/0131659 A1* | 6/2005 | Mei ............... G06T 17/10 703/1 |
| 2014/0300758 A1* | 10/2014 | Tran ............... H04N 5/225 348/207.1 |
| 2014/0354843 A1* | 12/2014 | Venkataraman ..... H04N 5/2253 348/218.1 |
| 2014/0368686 A1* | 12/2014 | Duparre ............ H01L 27/14621 348/218.1 |
| 2015/0374210 A1* | 12/2015 | Durr ............... A61B 1/041 600/111 |
| 2016/0267326 A1* | 9/2016 | Yagev .............. G06K 9/00704 |
| 2016/0335778 A1* | 11/2016 | Smits ............... G01P 3/36 |
| 2017/0154463 A1* | 6/2017 | von Cramon ........... G01S 17/00 |
| 2017/0155852 A1* | 6/2017 | von Cramon .......... H04N 5/332 |
| 2017/0187933 A1* | 6/2017 | Duparre ............... H04N 5/2254 |
| 2017/0201653 A1* | 7/2017 | Kyan .................. H04N 1/6027 |

OTHER PUBLICATIONS

Photomodeler, Film, Gaming and Animation, Nov. 28, 2016, pp. 1-3, retrieved from www.photomodeler.com/applications/film_gaming_anim/default.html.

Snavely et al., Modeling the World from Internet Photo Collections, International Journal of Computer Vision, 2008, pp. 189-210, vol. 80, retrieved from pdfs.semanticscholar.org/5e70/bb805cb99904504f12b3fa32ddaae066323c.pdf.

Toshev et al., Shape-based Object Recognition in Videos Using 3D Synthetic Object Models, IEEE: Computer Vision and Pattern Recognition, Jun. 25, 2009, pp. 288-295, retrieved from pdfs.semanticscholar.org/of68/81cdab058726eb9a33401d88903d8df0d1bc.pdf.

* cited by examiner

3D MODEL CONSTRUCTION FROM 2D ASSETS

TECHNICAL FIELD

The present disclosure relates generally to image processing.

DESCRIPTION OF THE RELATED ART

Photogrammetry can refer to the science of making measurements from photographs. The output of a photogrammetry process can be used to generate a map, drawing, measurement, a three-dimensional (3D) model of a real-world object or scene, etc. Photogrammetry has its origins in aerial photography, where an aircraft-mounted camera pointed towards the ground would take overlapping (two-dimensional (2D)) photos as the aircraft flew along a flight path. The photos could be processed in a stereo-plotter that would let an operator see two photos at once in stereo view, allowing terrain models or topographic maps to be generated.

BRIEF SUMMARY OF THE DISCLOSURE

In accordance with one embodiment, a computer-implemented method comprises performing at least one of local contrast enhancement and spectral suppression in relation to an object captured in each of a plurality of two dimensional (2D) images. Photogrammetry may be performed on the plurality of 2D images based upon information indicative of the local contrast enhancement and spectral suppression. Moreover, a computerized three dimensional (3D) model of the object may be generated based upon output information from the performance of photogrammetry.

The performance of local contrast enhancement comprises identifying and isolating one or more features of a surface of the object and increasing contrast in a region substantially about the one or more isolated features. The one or more features of the surface of the object comprise one or more variations in surface albedo of the surface of the object.

The computer-implemented method may further comprise tagging the one or more isolated features subsequent to the performance of the local contrast enhancement. The performance of photogrammetry comprises aligning the plurality of 2D images using the one or more isolated features as matching points. The performance of photogrammetry may further comprise generating a point cloud based upon at least the one or more isolated features. In some embodiments, the one or more features are associated with high frequency signals.

In accordance with some embodiments, the computer-implemented method may comprise amplifying the high frequency signals associated with the one or more features such that the signal-to-noise ratio of the amplified high frequency signals exceeds a 1:1 ratio. The performance of local contrast enhancement comprises increasing contrast in a region of pixels comprising a portion of a surface of the object so that one or more features of the surface of the object become detectable. The performance of spectral suppression comprises correlating one or more pixel values representative of a surface of the object to a reflection of a light source separate from the object. The performance of spectral suppression may further comprise ignoring one or more frequencies associated with the reflection when creating a data set to be utilized as input during the performance of photogrammetry.

In accordance with another embodiment, a computer-implemented method may comprise identifying an object in a media content, retrieving one or more two dimensional (2D) images representative of the media content in which the object is present, and filtering the one or more 2D images to obtain a subset of the one or more 2D images best representing the object. The computer-implemented method may further comprise performing at least one of local contrast enhancement and spectral suppression on a surface of the object. The computer-implemented method may further comprise generating optimized versions of the subset of the one or more 2D images based upon the information obtained through the performance of the at least one of local contrast enhancement and spectral suppression. Further still, the computer-implemented method may comprise generating a three dimensional (3D) model of the object based upon the optimized versions of the subset of the one or more 2D images.

In some embodiments, the performance of local contrast enhancement comprises identifying and isolating one or more features of the surface of the object and increasing contrast in a region substantially about the one or more isolated features. Performance of local contrast enhancement further comprises tagging the one or more isolated features and including information regarding the one or more isolated features as input to the performance of photogrammetry.

In some embodiments, the computer-implemented method may further comprise aligning each of the subset of the one or more 2D images using the one or more isolated features as matching points. Moreover, the computer-implemented method may comprise injecting noise into each of the subset of the one or more 2D images such that an artificial texture is generated on the surface of the object facilitating the identification and isolation of the one or more features of the surface of the object.

In some embodiments, the one or more isolated features are associated with high frequency signals. In some embodiments, the computer-implemented method further comprises amplifying the high frequency signals associated with the one or more isolated features such that the signal-to-noise ratio of the amplified high frequency signals exceeds a 1:1 ratio. Performance of the local contrast enhancement comprises increasing the localized contrast of red, green, blue (RGB) values of pixels representative of the one or more isolated features. Performance of spectral suppression comprises correlating one or more pixel values representative of a surface of the object to a reflection of a light source separate from the object. In some embodiments, the performance of spectral suppression further comprises ignoring one or more frequencies associated with the reflection when creating a data set to be utilized as input during the performance of photogrammetry

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

As alluded to above, photogrammetry can be utilized to generate 3D models based on 2D photos or images. In the context of 3D modeling, a plurality of 2D photos or images capturing or showing an object(s) or element(s) from differing angles may be imported into photogrammetry software/photogrammetry system. The various features of the object(s) or element(s) may be compared across the plurality of 2D photos or images, and a textured 3D model of the object(s) or element(s) can be generated.

In particular, the 2D photos may be "aligned" by finding common points and matching their positions. As more points are found and matched, the position at which each photo was taken can be determined, and a sparse point cloud can be created. A dense point cloud can be generated by interpolating points on the sparse point cloud, using the photos to add more detail. The dense point cloud can be converted into a wireframe model, and a surface(s) can be filled in on the wireframe model creating a mesh. The photos may be blended together to create a texture for the surface(s) mesh, resulting in a computerized 3D model, which can then be exported to other software, a 3D printer, etc. However, certain objects or elements captured in 2D photos or images can present issues when performing photogrammetry. For example, if an object of interest is highly reflective, performing photogrammetry would likely result in an inaccurate 3D model based on information regarding the reflections or what the object of interest is reflecting in the image, rather than information about the object itself.

Accordingly, various embodiments described herein may optimize one or more 2D images of the plurality of 2D images used to generate a 3D model via photogrammetry. To do this, various embodiments detect features of a surface and emphasize them so that they can be "highlighted" during the match detection operations of photogrammetry. Moreover, surface pixel information is analyzed to determine whether or not the information is merely indicative of a reflection or the surface of an object of interest. In this way, relevant object information is processed during photogrammetry.

Figure 1A:
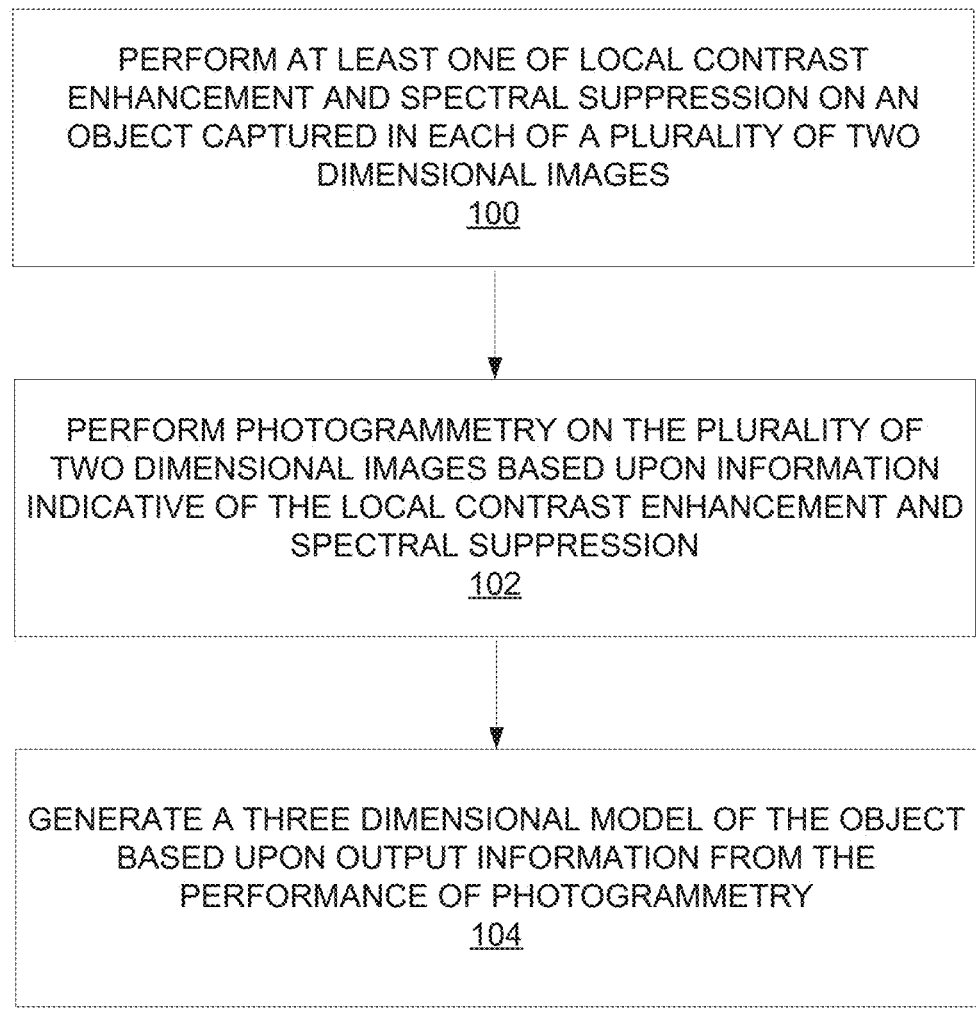
FIG. 1A is a flow chart illustrating example operations that can be performed to generate a 3D model from 2D assets in accordance with various embodiments.

FIG. 1A illustrates example operations that can be performed to generate a 3D model from 2D images, where each of the 2D images can be optimized prior to input into a photogrammetry process. At operation 100, at least one of local contrast enhancement and spectral suppression is performed on an object captured in each of a plurality of 2D images.

It should be noted that the terms "optimize," "optimal" and the like as used herein can be used to mean making or achieving performance as effective or perfect as possible.

However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

In particular, local contrast enhancement may include analyzing the object in the 2D image for any small variations in surface albedo (the ratio of radiation reflected to the radiation incident on a surface). Such variations can be cracks in the texture of the object, areas of chrome plating, dust, and/or other like features that are evidenced by a high frequency signature. In this way, information that is actually representative of the object rather than reflections can be used to characterize the surface(s) of the object. It should be noted that in the context of the present application, the size of "small variations" may differ depending on the image. However, various embodiments may determine, based on signal-to-noise ratio of the image, what elements may be noise and which may be a signal or part of a signal indicative of the image itself.

As described above, a plurality of 2D photos or images are used to output information from which a photogrammetry system can generate a 3D model of the object. Common points of the object can be identified, and their positions can be matched in order to align the 2D photos or images. These small variations or features can be identified (through metaphorical highlighting with software), isolated, and tracked throughout the plurality of 2D photos or images and used for this purpose of matching common points to align the 2D photos or images. In other words, a pattern determined to exist in multiple photos or images can be used to provide an alignment reference(s).

Additionally, the local contrast associated with or relative to the identified and isolated variations or features is enhanced. That is, the appearance of light to dark transitions applicable to the variations or features is increased or amplified. For example, in conventional photogrammetry systems, variations or features such as small cracks in the surface texture of an object (barely visible to the human eye) would be lost or discarded during processing. This is because such variations or features do not rise above the signal-to-noise ratio (SNR), and hence would be considered noise that is discarded. In accordance with various embodiments, the local contrast of RGB pixel values representative of such variations or features is increased resulting in the signal characteristics of the variations or features rising above an SNR of about 1:1 (indicating more signal than noise). This in turn helps to ensure that such variations or features are not discarded during processing, but instead utilized, e.g., as points, from which a sparse point cloud can be created.

It should be noted that in accordance with various embodiments, local contrast enhancement can be applied to a certain region(s) of pixels that will likely have one or more of the aforementioned variations or features. That is, instead of first looking for variations or features whose local contrast can be enhanced, the local contrast of a particular area on the surface of the object can be enhanced in order to potentially reveal the variations or features. In most instances, performing local contrast enhancement on smaller regions of pixels would likely yield better results. This is because increasing the contrast of a large area or feature of an object would likely result in the contrast of the small variations or features being altered "in step" with the larger area, thereby remaining obscured from detection. In one embodiment, identifying a small region of interest may include determining the overall properties of a surface texture, and sampling a region of the surface that exhibits the same or similar surface texture qualities. That sample can be used to judge other samples for similar properties. In some embodiments, a user can select a detail region as a representative sample via a user interface.

Specular suppression can refer to the suppression or de-emphasizing of specular reflections. Specular reflections can refer to the mirror-like reflection of, e.g., light waves, from a surface, where light is reflected back at the same angle as the angle of incidence on the surface. In the context of various embodiments, surface red, green, blue (RGB) image pixel values are analyzed in an attempt to determine whether the pixels are indicative of legitimate object surface details or merely reflective highlights. Because reflections can vary based on the position of the object, virtual and/or real-world cameras, as well as the lighting causing the reflection, such reflections should not be considered as being indicative of an object's 3D surface detail. Such reflections can confuse point detection algorithms. Since such reflections embody the color characteristics of a light source and not necessarily the surface of the object being solved, knowledge of the overall lighting in a scene in which the object is captured in the 2D photo or image can be used to suppress such reflections.

For example, an object such as a Christmas ornament may reflect Christmas tree lighting on its surface. Specular suppression may be performed in various embodiments by analyzing RGB pixel values commensurate with areas of the Christmas ornament's surface likely to contain or be indicative of specular reflections. If the Christmas ornament RGB pixel values in a certain area are indicative of a blue light, the scene may be analyzed for sources of blue light that could be the reason for the blue light being reflected by the surface of the Christmas ornament. If a source of blue light is found in the scene or is otherwise determined to exist, various embodiments are configured to disregard frequencies corresponding to the blue light, thereby suppressing information associated with that specular reflection.

Hence, various embodiments are able to re-engineer conditions present during the filming of a movie or the conditions present when a photo or image was generated, and differentiate between aspects of the scene and an object within that scene. It should be noted that in some embodiments, specular suppression can be used to characterize the scene (e.g., one or more aspects of the background) in which in object is located as opposed to characterizing the object. For example, specular reflections identified in the one or more aspects of a scene/background elements that can be associated with a particular object of dis-interest, may be suppressed in the same manner as described above.

Figure 1B:
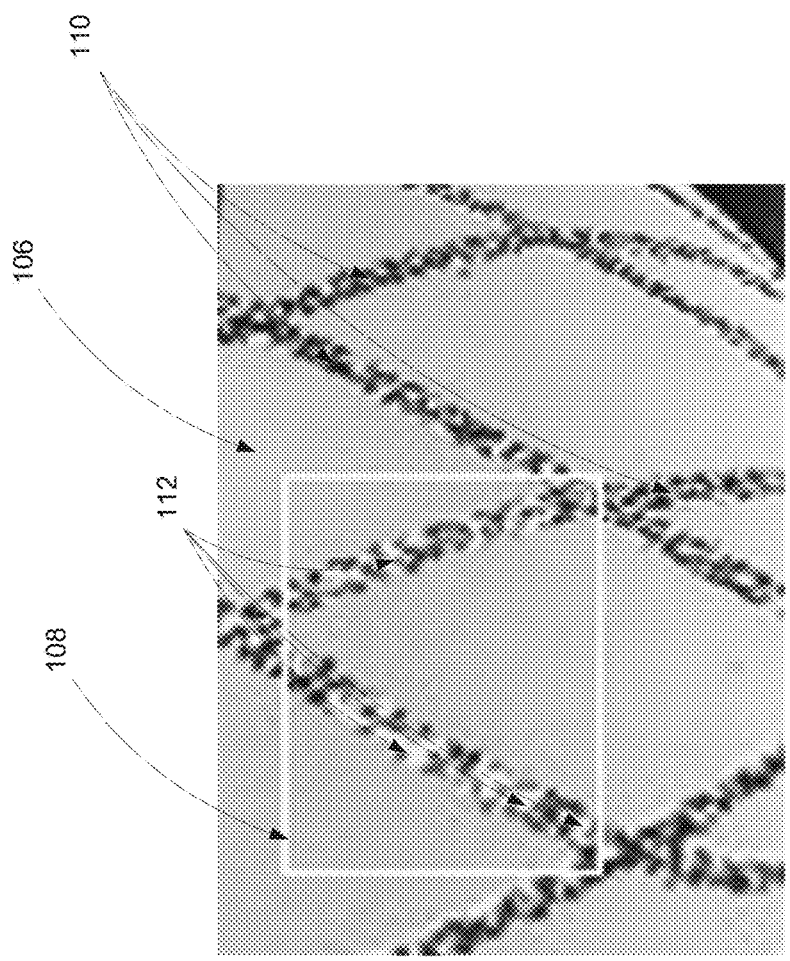
FIG. 1B illustrates an example of pixel identification for specular suppression and/or local contrast enhancement in accordance with various embodiments.

FIG. 1B illustrates an example representation of pixels of an image that may be identified for local contrast enhancement and/or specular suppression as described above. FIG. 1B illustrates a portion of an image of a Christmas ornament, a reflective orb, having a surface 106, and decorative crisscross elements that may be reflective 110. Within a particular "evaluation area" indicated by box 108, it may be determined that certain pixels (represented as dark/darker pixels) are representative of reflections from environmental lighting. Lighter pixels 112 may be patterns determined to be indicative of the actual surface of the Christmas ornament surface 106, rather than reflection "noise." The pixels may follow a traced path (the decorative crisscross elements) across multiple pixels, making such pixels localized patterns that can be evaluated across multiple corresponding images.

For example, pixels 112 may be pixels in a unique color space following a pixel path 121-100-116 (see example matrix below). Pixel 223 may be determined to exceed a defined threshold, and therefore, not likely to be part of the same feature/characteristic as that of pixel path 121-100-116.

$$\begin{matrix} 000 & 000 & 011 & 121 & 222 \\ 032 & 045 & 100 & 005 & 111 \\ 200 & 223 & 116 & 023 & 072 \end{matrix}$$

At operation 102, photogrammetry may be performed on the plurality of 2D images based upon information indicative of the local contrast enhancement and spectral suppression. As described previously, one or more points identified as being indicative of the object's surface may be used for point matching, while frequencies associated with spectral reflections are suppressed. As also described previously, a sparse and then a dense point cloud may be generated, and from the dense point cloud, a wire frame and mesh can be generated representative of the object's surface(s). At operation 104, a 3D model of the object may be generated based upon information output from performance of photogrammetry.

Figure 2:
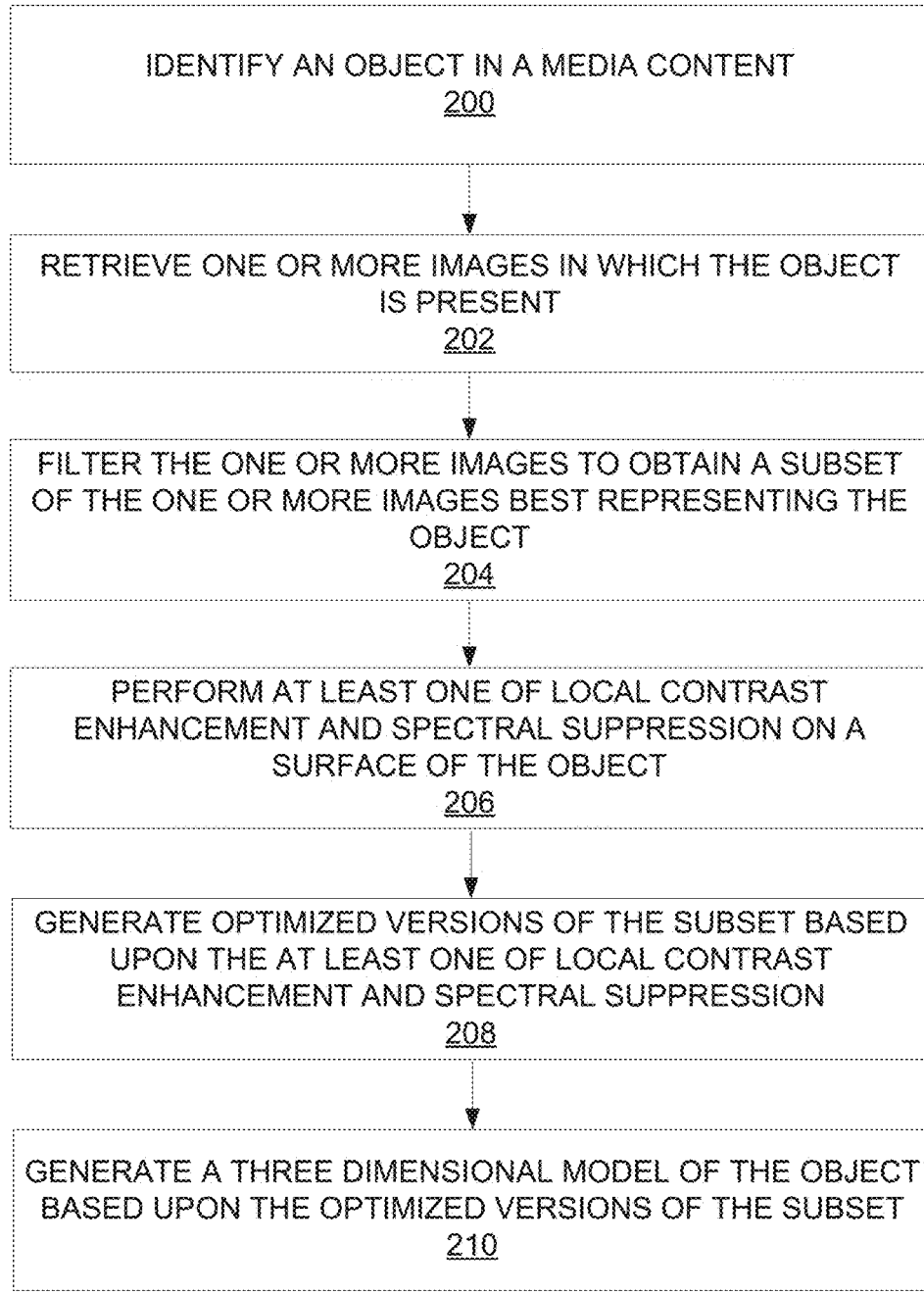
FIG. 2 is a flow chart illustrating example operations that can be performed to pre-process media content to optimize images for photogrammetry in order to generate a 3D model from 2D assets in accordance with various embodiments.

In some embodiments, where the 2D images to be used for generating a 3D model are images, such as frames of a 2D or 3D movie or other media content, certain pre-processing operations may be performed to extract the optimum 2D images from the media content. FIG. 2 is a flow chart illustrating various operations that may be performed in accordance with various embodiments for optimizing the 2D images to be used for photogrammetry. FIG. 2 will be described in conjunction with FIG. 3, which is a schematic representation of a processing pipeline in which one or more photogrammetry pre-processing operations are performed to generate a 3D model from 2D photos or images in accordance with various embodiments.

Figure 3:
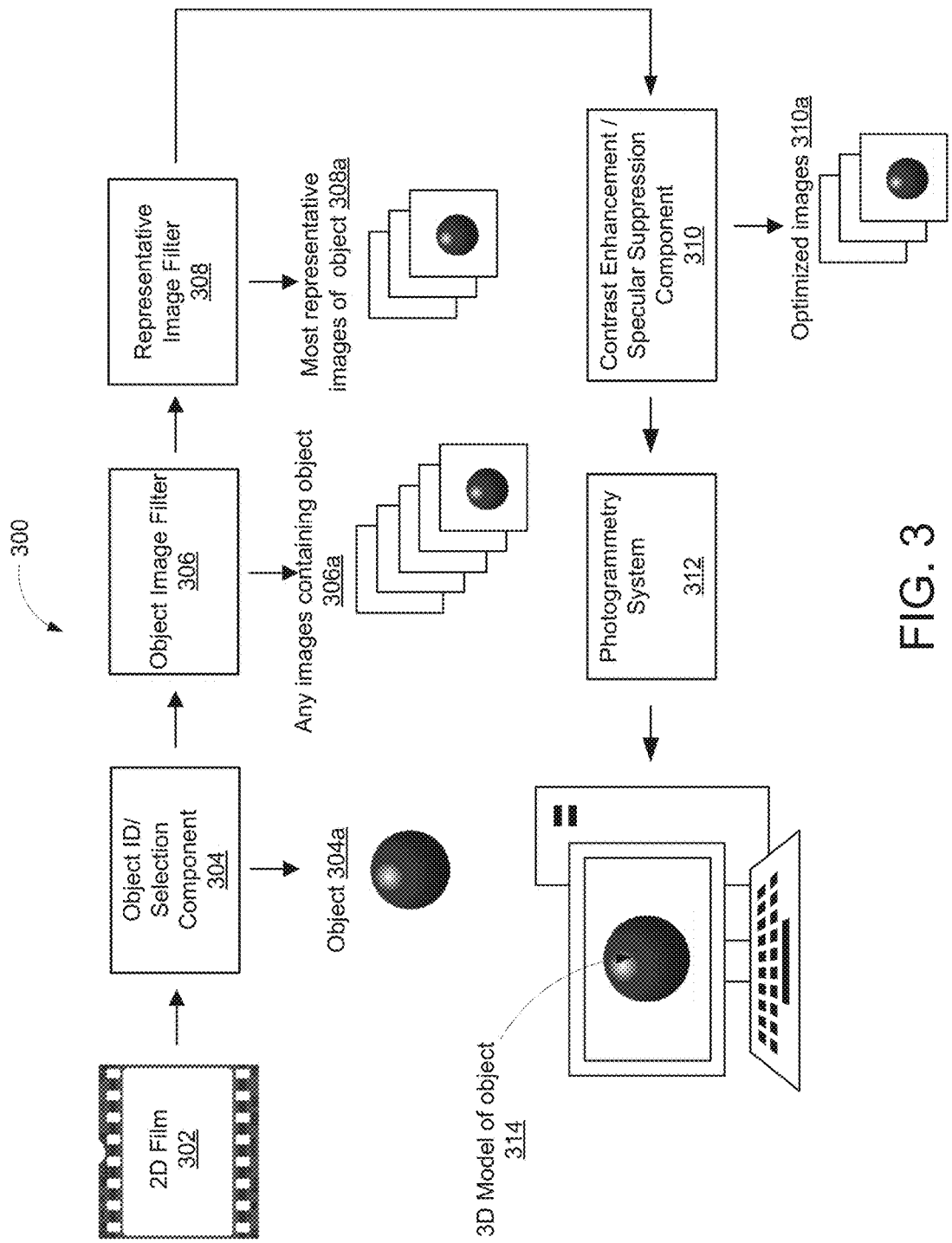
FIG. 3 is a schematic representation of a video processing pipeline in which one or more photogrammetry pre-processing operations are performed to generate a 3D model from 2D assets in accordance with various embodiments.

At operation 200, an object of interest may be identified in a media content. The media content may be any visual media content, e.g., a digital movie file, a set of digital photos or images, such as images taken of or frames extracted from movies, electronic games, and the like. FIG. 3 illustrates an example media content in the form of a 2D film 302. An object of interest may be a character, an actor, an object filmed or captured in a scene, etc. In FIG. 3, the object of interest may be an object 304a, such as a reflective ball. Software and/or hardware may be utilized to perform object identification and selection. For example, system 300 of FIG. 3 may be implemented as a stand-alone system or web-accessible service in which one or more processors or computing elements, such as servers, computers, etc. may be used to effectuate the functionality described herein. One or more known or future-developed facial or object recognition techniques may be used to identify an object of interest in media content. It should be noted that the use of visual media content having maximum color depth and resolution information can be advantageous although not required. For example, variations and/or features, such as surface albedo variations, can be more easily detected in higher resolution film footage.

At operation 202, one or more images in which the object is present are retrieved. For example, various embodiments may analyze a set of 2D photos or images from the relevant media content to determine whether or not the object of interest is present in one or more of the set of 2D photos or images. Referring to FIG. 3, an object image filter component 306 may be utilized to obtain the one or more images 306a containing the object of interest. The object image filter component 306 may comprise a comparison engine adapted to compare one or more features deemed to indicate the presence of the object in an image with the images or frames of 2D film 302.

At operation 204, one or more images are filtered to obtain a subset of the one or more images best representing the object. This function may be performed by a representative image filter 308, which may utilize various techniques and/or algorithms in order to filter the set of photos or images based on one or more characteristics of the object as captured. For example, images or frames of a movie in which the object of interest takes up 75% or more of the scene may be one criterion used by representative image filter 308 to pull out those images 308a best representing the object of interest. For example, images or frames meeting a certain sharpness threshold relative to the object of interest may be considered representative of an optimal image to be used for photogrammetry. Still other criteria can be used, including, but not limited to, object position, object aspect, visual state, etc. For example, an object's position can be used to provide information from other angles/aspects. For example, a particular aspect of an object, e.g., a particular outfit worn by a character, can be used to obtain desired images or frames for reference. For example, a particular object's visual state, e.g., a vehicle's appearance in images or frames prior to any alteration in subsequent images or frames, can be used as references.

At operation 206, at least one of local contrast enhancement and spectral suppression on a surface of the object can be performed. Local contrast enhancement and/or spectral suppression can be performed as previously described via contrast enhancement/spectral suppression component 310 operating in conjunction with the algorithms described above with regarding FIG. 1A.

At operation 208, optimized versions of the subset of images are generated based upon the at least one of the local contrast enhancement and the spectral suppression. For example, each of the subset of images may be exposed to local contrast enhancement and/or spectral suppression. In FIG. 3A, these images are represented as optimized images 310a. In some embodiments, noise can be added to an image to create "pseudo-texture" or artificially created texture in order to highlight aspects of the object that can be used, for example, as matching points. In some embodiments, some smaller subset may be subjected to local contrast enhancement and/or spectral suppression, while another subset is not. This can be done, for example, to mitigate potential errors in the optimization. For example, it may be that the performance of local contrast enhancement or spectral suppression results in degrading one or more images for purposes of photogrammetry, e.g., spectral suppression may be mistakenly applied to a region of pixels that actually represent the surface of the object of interest. For example, local contrast enhancement may be applied to a region of pixels that is too large, thereby negating its impact. In this way, points used to create, for example, a sparse point cloud may still be captured or detected/identified. That is, multiple "levels" of detail may be sampled to create multiple possible reconstructions. The "best" or "preferred" results may be selected, which may then be combined to form a model.

At operation 210, a 3D model of the object can be generated based upon the optimized versions of the subset of images. That is, photogrammetry as previously discussed may be performed by photogrammetry system 312 based upon the optimized subset of images, and a 3D model 314 can be generated.

It should be noted that various embodiments can be used to replace and/or negate the need for rotoscoping. That is, performing image optimization and feature enhancement/spectral suppression results in an accurate representation of an object that can be extracted for use on or with a different background, for example.

It should also be noted that the original "asset" from which a 3D model can be generated is not limited to 2D source material. For example, various embodiments can be used to generate 3D models of objects from actual 2D photos or images, as well as 2D photos or images of original 3D content or assets.

Moreover, information characterizing a known lens used in the production of visual media content, as well as placement of the camera lens can be used to enhance the 3D model representation of an object of interest. For example, a failure to consider relevant lens characteristics can result in a 3D model of an object of interest being accurate in only dimension/angle, and inaccurate in another.

Figure 4:
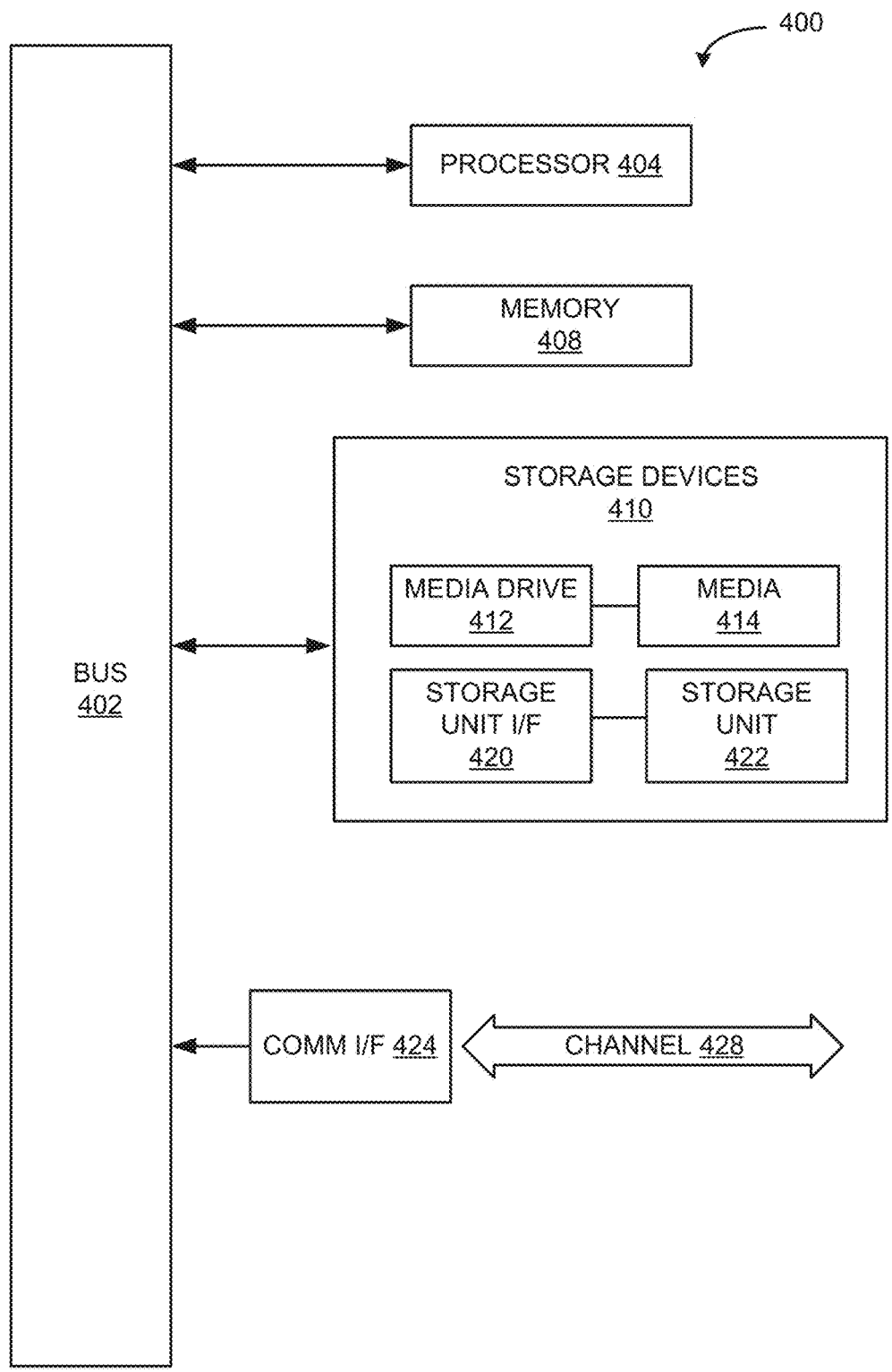
FIG. 4 is an example computing component that may be used to implement various features of embodiments described in the present disclosure.

FIG. 4 illustrates an example computing component that may be used to implement various features of the system and methods disclosed herein, such as the aforementioned features and functionality of one or more aspects of components 202, 204, 206, and/or 208 of FIG. 2.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components or components of the application are implemented in whole or in part using software, in one embodiment, these software elements can be implemented to operate with a computing or processing component capable of carrying out the functionality described with respect thereto. One such example computing component is shown in FIG. 4. Various embodiments are described in terms of this example-computing component 400. After reading this description, it will become apparent to a person skilled in the relevant art how to implement the application using other computing components or architectures.

Referring now to FIG. 4, computing component 400 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example navigation systems, portable computing devices, and other electronic devices that might include some form of processing capability.

Computing component 400 might include, for example, one or more processors, controllers, control components, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing component 400 or to communicate externally.

Computing component 400 might also include one or more memory components, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing component 400 might likewise include a read only memory ("ROM") or other static storage device coupled to bus 402 for storing static information and instructions for processor 404.

The computing component 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 414 might include, for example, a hard disk, an integrated circuit assembly, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing component 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory component) and memory slot, a PCMCIA slot and card, and other fixed or removable storage units 422 and interfaces 420 that allow software and data to be transferred from the storage unit 422 to computing component 400.

Computing component 400 might also include a communications interface 424. Communications interface 424 might be used to allow software and data to be transferred between computing component 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 400 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
performing, via a contrast enhancement and spectral suppression component of a three-dimensional (3D) model generation system, local contrast enhancement and spectral suppression in relation to an object captured in each of a plurality of two dimensional (2D) images, the local contrast enhancement and spectral suppression identifying information representative of the object itself in each of the plurality of 2D images to ensure that signals representing the object are actual surfaces of the object, wherein the performance of local contrast enhancement comprises identifying and isolating one or more features of a surface of the object and increasing contrast in a region substantially about the one or more isolated features;
performing, via a photogrammetry system of the 3D model generation system, photogrammetry on the plurality of 2D images based upon the information representative of the object itself while ignoring information not representative of the object itself in each of the plurality of 2D images; and
generating, via a computer processor of the 3D model generation system, a computerized three dimensional (3D) model of the object based upon output information from the performance of photogrammetry.

2. The computer-implemented method of claim 1, wherein the one or more features of the surface of the object comprise one or more variations in surface albedo of the surface of the object.

3. The computer-implemented method of claim 1, further comprising tagging the one or more isolated features subsequent to the performance of the local contrast enhancement.

4. The computer-implemented method of claim 2, wherein the performance of photogrammetry comprises aligning the plurality of 2D images using the one or more isolated features as matching points.

5. The computer-implemented method of claim 1, wherein the performance of photogrammetry further comprises generating a point cloud based upon at least the one or more isolated features.

6. The computer-implemented method of claim 1, wherein the one or more features are associated with high frequency signals.

7. The computer-implemented method of claim 6, further comprising amplifying the high frequency signals associated with the one or more features such that the signal-to-noise ratio of the amplified high frequency signals exceeds a 1:1 ratio.

8. The computer-implemented method of claim 1, wherein the performance of local contrast enhancement comprises increasing contrast in a region of pixels comprising a portion of a surface of the object so that one or more features of the surface of the object become detectable.

9. The computer-implemented method of claim 1, wherein the performance of spectral suppression comprises correlating one or more pixel values representative of a surface of the object to a reflection of a light source separate from the object.

10. The computer-implemented method of claim 9, wherein the performance of spectral suppression further comprises the ignoring of the information not representative of the object itself, the information not representative of the object itself comprising one or more frequencies associated with the reflection when creating a data set to be utilized as input during the performance of photogrammetry.

11. A computer-implemented method, comprising:
identifying, via an object identification and selection component of a three-dimensional (3D) model generation system, an object in a media content;
retrieving, via an object image filter of the 3D model generation system, one or more two dimensional (2D) images representative of the media content in which the object is present;
filtering, via a representative image filter of the 3D model generation system, the one or more 2D images to obtain a subset of the one or more 2D images best representing the object;
performing, via a contrast enhancement and spectral suppression component of the 3D model generation system, local contrast enhancement and spectral suppression on a surface of the object, the local contrast enhancement and spectral suppression identifying information representative of the object itself in each of the one or more 2D images to ensure that signals representing the object are actual surfaces of the object, wherein the performance of local contrast enhancement comprises identifying and isolating one or more features of a surface of the object and increasing contrast in a region substantially about the one or more isolated features;
generating, via the contrast enhancement and spectral suppression component of the 3D model generation system optimized versions of the subset of the one or more 2D images based upon the information representative of the object itself while ignoring information not representative of the object itself in each of the one or more 2D images obtained through the performance of the local contrast enhancement and spectral suppression; and
generating, via a computer processor of the 3D model generation system, a three dimensional (3D) model of the object based upon the optimized versions of the subset of the one or more 2D images.

12. The computer-implemented method of claim 11, wherein the performance of local contrast enhancement further comprises tagging the one or more isolated features and including information regarding the one or more isolated features as input to the performance of photogrammetry.

13. The computer-implemented method of claim 12, further comprising aligning each of the subset of the one or more 2D images using the one or more isolated features as matching points.

14. The computer-implemented method of claim 11, further comprising injecting noise into each of the subset of the one or more 2D images such that an artificial texture is generated on the surface of the object facilitating the identification and isolation of the one or more features of the surface of the object.

15. The computer-implemented method of claim 11, wherein the one or more isolated features are associated with high frequency signals.

16. The computer-implemented method of claim 15, further comprising amplifying the high frequency signals associated with the one or more isolated features such that the signal-to-noise ratio of the amplified high frequency signals exceeds a 1:1 ratio.

17. The computer-implemented method of claim 11, wherein the performance of the local contrast enhancement comprises increasing the localized contrast of red, green, blue (RGB) values of pixels representative of the one or more isolated features.

18. The computer-implemented method of claim 11, wherein the performance of spectral suppression comprises correlating one or more pixel values representative of a surface of the object to a reflection of a light source separate from the object.

19. The computer-implemented method of claim 18, wherein the performance of spectral suppression further comprises the ignoring of the information not representative of the object itself, the information not representative of the object itself comprising one or more frequencies associated with the reflection when creating a data set to be utilized as input during the performance of photogrammetry.

* * * * *